(12) United States Patent
Hwang

(10) Patent No.: US 7,571,374 B2
(45) Date of Patent: Aug. 4, 2009

(54) METHOD FOR TRANSMITTING AND PROCESSING COMMAND AND DATA

(75) Inventor: Byung-Ho Hwang, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 608 days.

(21) Appl. No.: 10/984,044

(22) Filed: Nov. 8, 2004

(65) Prior Publication Data

US 2005/0105518 A1    May 19, 2005

(30) Foreign Application Priority Data

Nov. 14, 2003  (KR) .................... 10-2003-0080633

(51) Int. Cl.
*H03M 13/00* (2006.01)
(52) U.S. Cl. .................. 714/776; 714/748; 714/749
(58) Field of Classification Search ................ 714/776, 714/748, 749
See application file for complete search history.

(56) References Cited

U.S. PATENT DOCUMENTS

| 5,099,346 | A | 3/1992 | Lee et al. |
| 6,157,324 | A | 12/2000 | Iwata |
| 6,449,654 | B1 | 9/2002 | Blackwell et al. |
| 2003/0009610 | A1 | 1/2003 | Nolan et al. |
| 2003/0046377 | A1 | 3/2003 | Daum et al. |

FOREIGN PATENT DOCUMENTS

| EP | 0-869-612 A2 | 10/1998 |
| WO | WO 01/13542 | 2/2001 |

*Primary Examiner*—Guy J Lamarre
(74) *Attorney, Agent, or Firm*—Lee, Hong, Degerman, Kang & Waimey

(57) ABSTRACT

Disclosed is a method in which a computer and a personal digital assistant easily and stably transmit commands and data through a serial interface and process them. To this end, the method for transmitting a command comprises: generating a command packet including a command frame, a length frame, a command data frame, an error check fame and an end character frame; and transmitting the command packet.

9 Claims, 3 Drawing Sheets

METHOD FOR TRANSMITTING AND PROCESSING COMMAND AND DATA

CROSS-REFERENCE TO RELATED APPLICATIONS

Pursuant to 35 U.S.C. 119(a), this application claims the benefit of earlier filing date and right of priority to Korean Application No. 80633/2003, filed on Nov. 14, 2003, the contents of which are hereby incorporated by reference herein in their entirety.

BACKGROUND OF THE INVENTION

1. Field of the Invention

The present invention relates to a method for transmitting and processing commands and data, and particularly, to a method for transmitting commands and data through a serial interface and processing the same.

2. Description of the Background Art

Recently, personal digital assistants (PDA) which were utilized for a business purpose in enterprises or the like are being popularized by general users. The personal digital assistant (PDA) includes various functions such as personal schedule management, an e-book, a digital music player, a game and the like.

The personal digital assistant, unlike a general computer, records an operating system (OS) and an application in a read only memory (ROM). In the conventional art, the OS and the application could not be upgraded because they were recorded in a mask ROM. However, at present, by being recorded in a Flash ROM, the OS and the application can be upgraded.

FIG. 1 is a view showing a structure of a ROM and a random access memory (RAM) of a general PDA.

As shown, the ROM of the PDA includes a bootloader region 101, an operating system and application region 102 and a system configuration data region 103. The RAM of the PDA includes a bootloader RAM region 104, a system region and a storage region 105, and an additional region 106.

First, when power is applied to the PDA, the bootloader 101 is executed.

The bootloader 101 initializes the hardware of the PDA, and passes the OA 102 a control. When the hardware is initialized, the OA 102 boots and executes the PDA.

Meanwhile, to correct a bug of the software of the PDA or to improve performance of the PDA, a method for easily upgrading and backing up the ROM of the PDA is required. Namely, the conventional art is disadvantageous in that a method for transmitting and processing commands and data, which can easily and stably upgrade and back up information recorded in the PDA, is not employed in the PDA.

SUMMARY OF THE INVENTION

Therefore, an object of the present invention is to provide a method for transmitting and processing commands and data capable of easily and stably upgrading and backing up information of a personal digital assistant (PDA).

Another object of the present invention is to provide a method for transmitting and processing commands and data, in which a computer and a PDA easily and stably transmit commands and data to each other and process the commands and the data.

To achieve these and other advantages and in accordance with a purpose of the present invention, as embodied and broadly described herein, there is provided a method for transmitting a command comprising: generating a command packet including a command frame, a length frame, a command data frame, an error check frame and an end character frame; and transmitting the command packet.

To achieve these and other advantages and in accordance with a purpose of the present invention, as embodied and broadly described herein, there is provided a method for processing a command comprising: receiving through a serial interface a command packet including a command frame, a length frame, a common data frame, an error check frame and an end character frame; erasing the end character frame of the received command packet; decoding the command packet where the end character frame has been erased; and erasing the error check frame of the decoded command packet.

To achieve these and other advantages and in accordance with a purpose of the present invention, as embodied and broadly described herein, there is provided a method for transmitting data comprising: generating a data packet including a synchronous frame, a packet number frame, a data frame and an error check frame; and transmitting the data packet.

To achieve these and other advantages and in accordance with the purpose of the present invention, as embodied and broadly described herein, there is provided a method for processing data comprising: receiving through a serial interface a data packet including a synchronous frame, a packet number frame, a data frame and an error check frame; and erasing the error check frame of the data packet if the first frame of the data packet is the synchronous frame and a packet number of the data packet is the same as a packet number of a data packet to be received.

To achieve these and other advantages and in accordance with a purpose of the present invention, as embodied and broadly described herein, there is provided a method for transmitting commands and data, in which a personal digital assistant and a computer transmit commands and data to each other through a serial interface, comprising: transmitting a command packet including a command frame, a length frame, a command data frame, a CRC (Cyclic-Redundancy Check) frame and an end character frame; and transmitting a data packet including a synchronous frame, a packet number frame, a data frame and a parity frame.

To achieve these and other advantages and in accordance with a purpose of the present invention, as embodied and broadly described herein, there is provided a method for processing a command, in which a command packet received through a serial interface is processed, comprising: receiving through the serial interface a command packet including a command frame, a length frame, a command data frame, a CRC (Cyclic-Redundancy Check) frame and an end character frame; erasing the end character frame if the last byte of the command packet received through the serial interface is the end character frame; asking for retransmission of the command packet if the last byte of the command packet is not the end character frame; decoding the command packet where the end character frame has been erased; erasing the CRC frame if an error is not generated at the decoded command packet after checking the CRC frame of the decoded command packet; and asking for retransmission of the command packet if an error is generated at the decoded command packet after checking the CRC frame of the decoded command packet.

To achieve these and other advantages and in accordance with a purpose of the present invention, as embodied and broadly described herein, there is provided a method for processing data, in which a data packet received through a serial interface is processed, comprising: receiving a data packet including a synchronous frame, a packet number frame, a data frame and a parity frame; verifying that the first frame of the data packet is a synchronous frame; checking whether a packet number of the data packet is the same as a packet number of a data packet to be received if the first frame of the data packet is the synchronous frame; and erasing the parity frame if the packet number of the received data packet is the same as the packet number of the data packet to be received and an error is not generated at the data packet after checking the parity frame of the data packet.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

A method in which a computer and a personal digital assistant (PDA) transmit commands and data to each other through a serial interface such as RS-232C (Recommended Standard-232C) and process them will now be described in detail with reference to FIGS. 2A to 3B.

Figure 1:
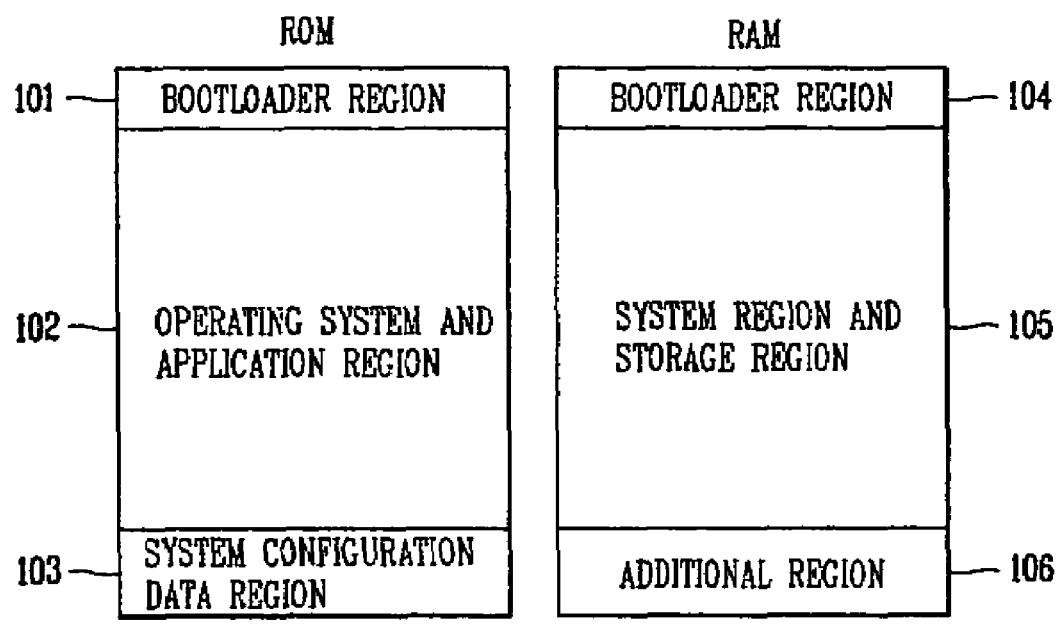
FIG. 1 is a view showing a structure of a ROM and a random access memory (RAM) of a general personal digital assistant (PDA)
Figure 2A:
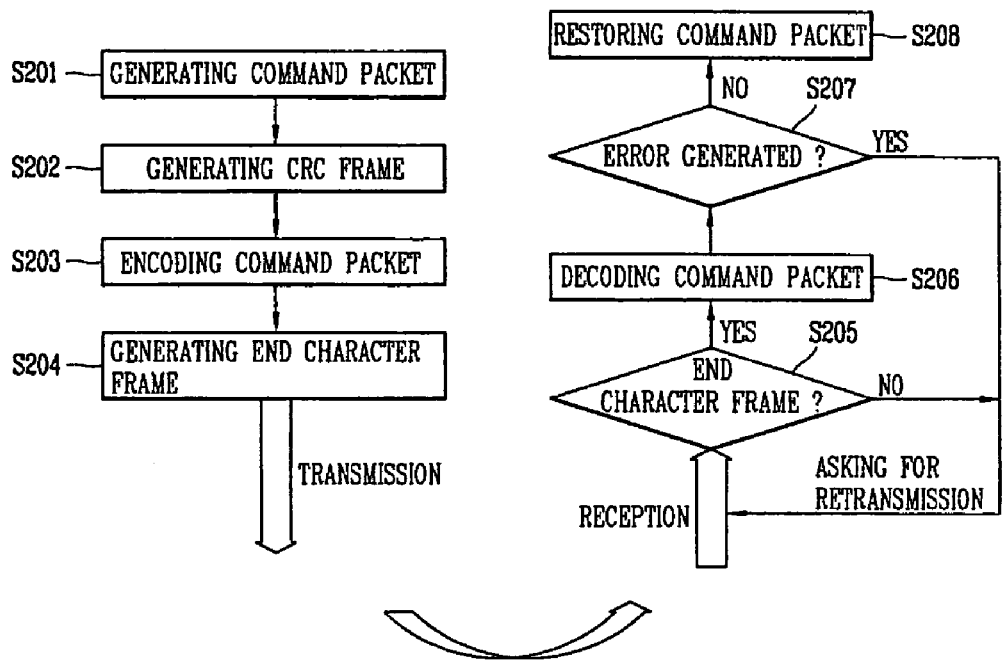
FIG. 2A is a flow chart showing a method for transmitting and processing a command packet in a serial communications protocol in accordance with an embodiment of the present invention.

FIG. 2A is a flow chart showing a method for transmitting and processing a command packet in a serial communications protocol in accordance with an embodiment of the present invention.

Figure 2B:
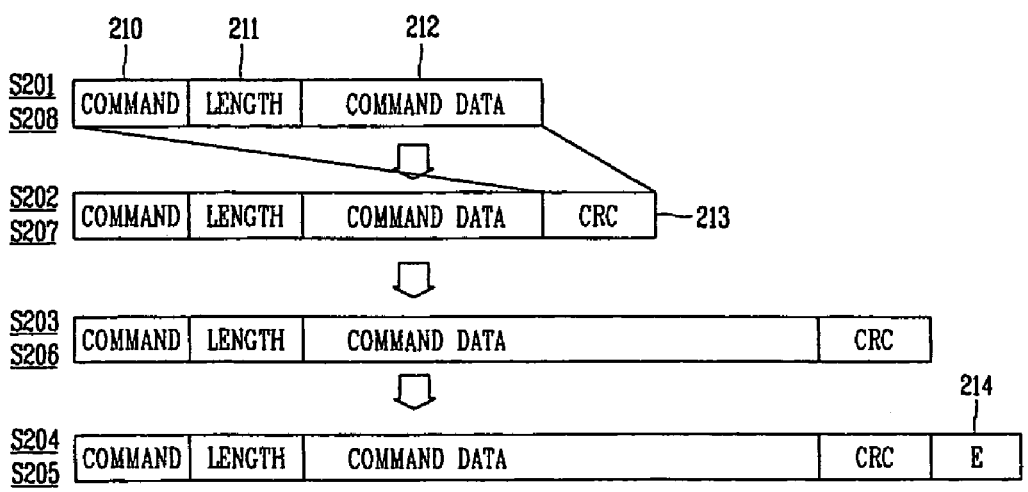
FIG. 2B is a view showing a command packet transform process of FIG. 2A.

FIG. 2B is a view showing a command packet transform process of FIG. 2A.

As shown in FIG. 2B, the command packet includes a command frame 210, a packet length frame 211, a command data frame 212, a CRC (Cyclic-Redundancy Check) frame 213 and an end character frame (E) 214.

A method for transmitting a command packet through a serial interface and processing the transmitted command packet will now be described in detail with reference to FIGS. 2A and 2B. Here, S201~S204 are steps for transmitting a command packet, and S205~S208 are steps for processing a command packet.

First, a transmitting station (e.g., a personal digital assistant (PDA)) generates the command packet. The command packet preferably includes a command frame 210, a packet length frame 211 and a command data frame 212. Preferably, the command frame 210 and the packet length frame 211 each have 1 byte, and the command data frame 212 has 28 bytes (S201).

After generating the command packet, the transmitting station (e.g., a PDA) generates an error check frame 213 for checking whether an error is generated at the command packet and includes the generated error check frame 213 in the command packet. To guarantee the integrity of the command packet, a CRC (Cyclic-Redundancy Check), particularly, "CRC-16", is preferably used. In case of the CRC-16, two bytes of CRC value is generated, and the CRC value follows an end of the command packet. Because the CRC-16 would be understood by those skilled in the art, detailed descriptions on the CRC-16 will be omitted (S202).

Thereafter, the transmitting station (e.g., a PDA) encodes the command packet. For example, the transmitting station (e.g., a PDA) encodes the command packet so that a special character defined in a CRC-16 algorithm is not included in the command packet. By such an encoding process, the command data of the command packet can be extended up to 56 bytes (S203).

After encoding the command packet, the transmitting station (e.g., a a PDA) generates an end character frame, includes the generated end character frame (E) 214 in the command packet, and transmits the command packet including the end character frame (E) 214 to a destination station (e.g., a computer) through a serial interface. To indicate an end of the command packet, the generated end character frame (E) 214 follows an end of the encoded command packet. Preferably, the end character frame (E) 214 preferably has 1 byte (S204).

A process for processing the transmitted command packet will now be described in detail with reference to S205~S208 of FIG. 2A.

First, the destination station (e.g., a computer) receives the command packet through a serial interface and verifies the end character frame (E) 214 of the received command packet. Namely, the destination station (e.g., a computer) verifies whether the last byte of the received command packet is the end character frame (E) 214 (S205).

If the last byte of the received command packet is not an end character frame (E) 214, the destination station (e.g., a computer) transmits NAK (Non Acknowledgement) to the transmitting station (e.g., a PDA) and ask the transmitting station to retransmit the command packet.

In contrast, if the last byte of the command packet is an end character frame 214, the destination station (e.g., a computer) erases the end character frame 214. Here, the NAK is for establishing a data link between a transmitting station and a destination station. The NAK is a transmission control signal that is transmitted from the destination station to the transmitting station in order to require that the transmitting station should not transmit data when the destination station is not ready to receive the data from the transmitting station or to require that the transmitting station retransmit the data when an error is generated at the received data. Because the NAK would be understood by those skilled in the art, detailed descriptions thereon will be omitted.

Thereafter, the destination station (e.g., a computer) decodes the received command packet (S206). By decoding the command packet according to the CRC-16 algorithm, the command packet is restored.

After decoding the received command packet, the destination station (e.g, a computer) checks whether an error is generated at the received command packet (S207). Namely, by checking whether the CRC value is an appropriate value, the integrity of the command packet is verified. In contrast, if it is determined by the CRC value that an error is generated at the received command packet, the destination station (e.g., a computer) transmits the NAK (Non-Acknowledgement) to the transmitting station (e.g., PDA) to thereby ask the transmitting station to retransmit the command packet.

Thereafter, the destination station (e.g., a computer) restores the command packet (S208). Namely, if an error is not generated at the command packet, the destination station (e.g., a computer) erases the CRC frame 213, thereby restoring the command packet to an original state.

Figure 3A:
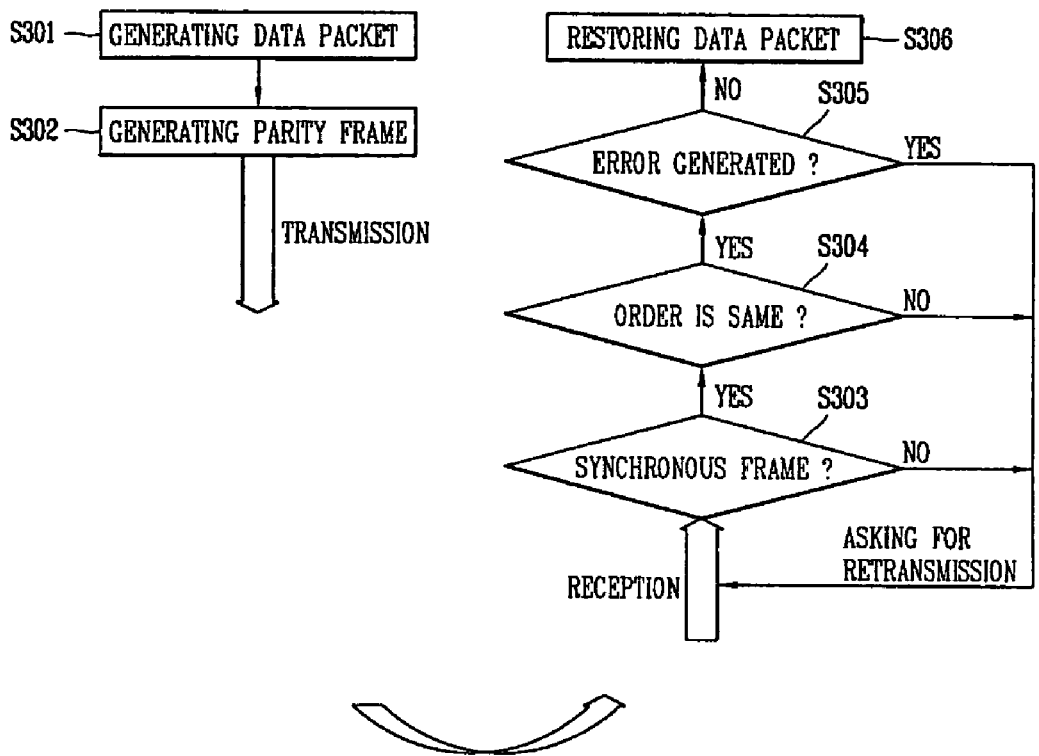
FIG. 3A is a flow chart showing a method for transmitting and processing a data packet in a serial communications protocol in accordance with an embodiment of the present invention.

FIG. 3A is a flow chart showing a method for transmitting and processing a data packet in a serial communications protocol in accordance with an embodiment of the present invention.

Figure 3B:
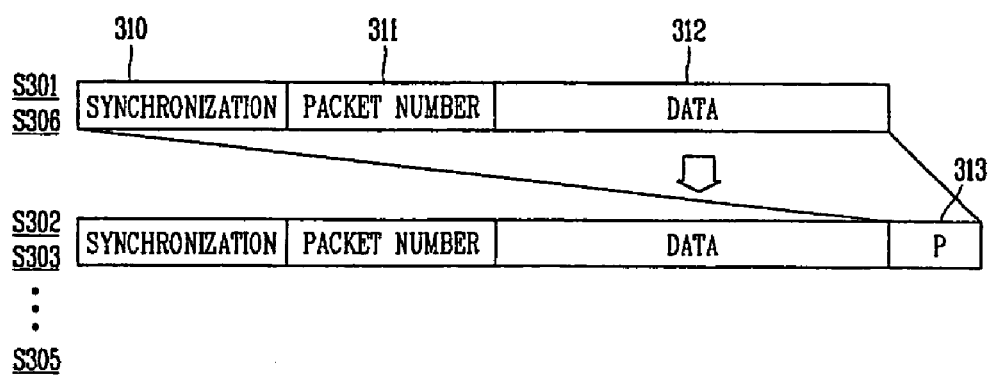
FIG. 3B is a view showing a data packet transform process of FIG. 3A.

FIG. 3B is a view showing a data packet transform process of FIG. 3A.

As shown in FIG. 3B, the data packet transmitted in response to the command packet includes a synchronous frame 310, a packet number frame 311, a data frame 312 and a parity frame (P) 313.

A method for transmitting and processing the data packet will now described in detail with reference to FIGS. 3A and 3B. Here, S301~S302 are steps for transmitting the data packet, and S303~S306 are steps for processing the data packet.

First, the transmitting station (e.g., a computer) generates the data packet. The data packet preferably includes a synchronous frame 310, a packet number frame 311 and a data frame 312 (S301).

Preferably, the synchronous frame 310 and the packet number frame 311 each have 1 byte, and the data frame 312 has maximum 512 bytes. Contents or sizes of the frames 310, 311 and 312 of the data packet can be varied by those skilled in the art.

After generating the data packet, the transmitting station (e.g., a computer) generates a parity frame (P) 313, includes the parity frame 313 in the data packet and transmits the data packet including the parity frame 313 to a destination station (e.g., a PDA) through a serial interface (S302). Because a large amount of data packets are generally transmitted, unlike the case of transmitting the command packet, if CRC values are calculated one by one, an entire transmission speed is lowered. Therefore, when the data packet is transmitted, it is preferable that only a process of verifying the parity value is carried out. Here, a random parity algorithm can be used, and particularly, 2-byte parity using an exclusive OR is used.

A process for processing the data packet will now be described in detail with reference to S303~S306.

First, the destination station (e.g., a PDA) receives the data packet and verifies a synchronous frame of the received data packet. Namely, it is verified that the first byte of the data packet is a synchronous frame 310 (S303).

If the first byte of the data packet is a synchronous frame 310, the destination station (e.g., a PDA) verifies whether an order of the received packet is right. Namely, the destination station (e.g., a PDA) checks the packet number frame 311 to thereby verify whether a packet number of the data packet is the same as a packet number of a data packet to be received. Here, preferably, if the order of the data packet is not right, the destination station (e.g., a PDA) transmits the NAK (Non Acknowledgement) to the transmitting station (e.g., a computer) to ask the transmitting station to retransmit the data packet (S304).

If an order of the data packet is right, the destination station (e.g., a PDA) checks whether an error is generated at the data packet. Namely, the destination station (e.g., a PDA) checks the parity frame 313 to verify whether a parity value is an appropriate value. If the parity value is not an appropriate value after the parity frame 313 check, the destination station (e.g., a PDA) transmits the NAK (Non Acknowledgement) to the transmitting station (e.g., a computer) to ask the transmitting station (e.g., a computer) to retransmit the data packet (S305).

If an error is not generated at the data packet, the destination station (e.g., PDA) restores the data packet. Namely, if the parity value is an appropriate value, the destination station (e.g., PDA) restores the data packet by erasing the parity frame 313 (S306).

Meanwhile, the method for transmitting and processing commands and data can be used for personal digital assistants (PDAs), computers and various communication devices using a serial communications protocol for transmitting and receiving commands and data.

As so far described, the method for transmitting and processing commands and data in accordance with the present invention is advantageous in that commands and data can be easily and stably transmitted and received through a serial interface.

Also, the method for transmitting and processing commands and data in accordance with the present invention advantageously provides convenience and stability to users of PDAs and manufacturers by easily and stably transmitting and receiving commands and data.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for transmitting a command packet from a mobile terminal comprising:

determining that a command packet is to be transmitted to a terminal;

generating a command packet comprising a command frame, a length frame, an error check frame, and a command data frame encoding the command packet;

generating an end character frame at the end of the encoded command packet, wherein the error check frame is used to check whether an error is generated in the command packet and the end character frame is the final frame in the generated command packet for indicating an end of the command packet;

transmitting the encoded command packet with the end character frame to the terminal;

receiving an encoded data packet from the terminal in response to the command packet; and performing a function in response to receiving the encoded data packet from the terminal.

2. The method of claim 1, wherein the error check frame is a CRC (Cyclic-Redundancy Check) frame.

3. The method of claim 1, wherein the determining that a command packet is to be delivered to the terminal further comprises the mobile terminal receiving a request to backup or upgrade information stored in memory.

4. A method for processing a command comprising:
  receiving via a serial interface a command packet comprising a command frame, a length frame, a common data frame, an error check frame, and an end character frame;
  erasing the end character frame of the received command packet;
  decoding the command packet where the end character frame has been erased; and
  erasing the error check frame of the decoded command packet, wherein the error check frame of the decoded command packet is processed to determine whether an error is generated at the decoded command packet, and erasing the error check frame if an error is not generated in the decoded command packet;
  transmitting a data packet in response to the command packet if an error was not generated in the decoded command packet, wherein the data packet may backup or upgrade information stored in memory of the mobile terminal.

5. The method of claim 4, wherein erasing the end character frame comprises:
  erasing the end character frame if the last byte of the command packet transmitted via the serial interface is the end character frame.

6. The method of claim 4, further comprising:
  requesting retransmission of the command packet if the last byte of the command packet is not the end character frame.

7. The method of claim 4, further comprising:
  requesting retransmission of the command packet if an error is generated in the decoded command packet.

8. The method of claim 4, further comprising:
  requesting a retransmission of the command packet through Non-Acknowledgement (NAK) if an error is generated in the decoded command packet.

9. A method for processing a command, in which a command packet received via a serial interface is processed, the method comprising:
  receiving via the serial interface a command packet including a command frame, a length frame, a command data frame, a CRC (Cyclic-Redundancy Check) frame and an end character frame;
  erasing the end character frame if the last byte of the command packet received through the serial interface is the end character frame;
  requesting retransmission of the command packet if the last byte of the command packet is not the end character frame;
  decoding the command packet where the end character frame has been erased;
  erasing the CRC frame if an error is not generated in the decoded command packet after checking the CRC frame of the decoded command packet; and
  requesting retransmission of the command packet if an error is generated in the decoded command packet after checking the CRC frame of the decoded command packet;
  transmitting a data packet in response to the command packet if an error was not generated in the decoded command packet, wherein the data packet may backup or upgrade information stored in flash memory of the mobile terminal.

* * * * *